United States Patent
de Oliveira et al.

(10) Patent No.: US 9,051,470 B2
(45) Date of Patent: Jun. 9, 2015

(54) METHOD FOR PRODUCING THIN FILMS AND THE APPLICATION THEREOF

(75) Inventors: Peter William de Oliveira, Saarbruecken (DE); Michael Veith, St.-Ingbert (DE)

(73) Assignee: Leibniz-Institut fuer Neue Materialien gemeinnuetzige GmbH, Saarbruecken (DE)

( * ) Notice: Subject to any disclaimer, the term of this patent is extended or adjusted under 35 U.S.C. 154(b) by 382 days.

(21) Appl. No.: 13/387,751

(22) PCT Filed: Jul. 15, 2010

(86) PCT No.: PCT/EP2010/004327
§ 371 (c)(1),
(2), (4) Date: Jan. 30, 2012

(87) PCT Pub. No.: WO2011/012227
PCT Pub. Date: Feb. 3, 2011

(65) Prior Publication Data
US 2012/0129967 A1    May 24, 2012
US 2013/0046041 A2    Feb. 21, 2013

(30) Foreign Application Priority Data
Jul. 30, 2009   (DE) .................. 10 2009 035 673

(51) Int. Cl.
| | |
|---|---|
| C09C 1/00 | (2006.01) |
| C09C 3/08 | (2006.01) |
| B82Y 30/00 | (2011.01) |
| C09D 5/36 | (2006.01) |
| C09D 7/12 | (2006.01) |
| C08K 3/22 | (2006.01) |
| C08K 9/08 | (2006.01) |

(52) U.S. Cl.
CPC . C09C 3/08 (2013.01); B82Y 30/00 (2013.01); *C01P 2004/64* (2013.01); *C08K 3/22* (2013.01); *C08K 9/08* (2013.01); C09D 5/36 (2013.01); C09D 7/1225 (2013.01)

(58) Field of Classification Search
USPC ............... 521/57, 189; 264/495; 427/180; 106/31.33, 157.8
See application file for complete search history.

(56) References Cited

U.S. PATENT DOCUMENTS

| | | | |
|---|---|---|---|
| 3,438,796 A | 4/1969 | Hanke | |
| 3,957,354 A | 5/1976 | Knop | |
| 4,149,337 A * | 4/1979 | Habisohn | ............. 446/19 |
| 5,135,812 A | 8/1992 | Phillips et al. | |
| 5,931,996 A | 8/1999 | Reisser et al. | |
| 6,291,070 B1 | 9/2001 | Arpac et al. | |
| 6,455,103 B1 * | 9/2002 | Mennig et al. | ............. 427/165 |
| 6,586,483 B2 * | 7/2003 | Kolb et al. | ............. 521/91 |
| 6,749,777 B2 | 6/2004 | Argoitia et al. | |
| 6,761,762 B1 | 7/2004 | Greiwe et al. | |
| 8,133,573 B2 | 3/2012 | Jilavi et al. | |
| 2005/0101698 A1 * | 5/2005 | Harada et al. | ............. 523/210 |
| 2005/0191523 A1 | 9/2005 | Dattelbaum et al. | |
| 2006/0014017 A1 | 1/2006 | Pilotek et al. | |
| 2009/0249979 A1 | 10/2009 | Kaupp et al. | |

FOREIGN PATENT DOCUMENTS

| | | | |
|---|---|---|---|
| DE | 19501307 A1 | 7/1996 | |
| DE | 19719948 A1 * | 11/1998 | .............. B05D 7/26 |
| DE | 19823732 A1 | 12/1999 | |
| DE | 19912160 A1 | 9/2000 | |
| DE | 10252645 A1 | 5/2004 | |
| DE | 102004012977 A1 | 10/2005 | |
| DE | 102005005782 A1 | 8/2006 | |
| DE | 102006009129 A1 | 8/2007 | |
| EP | 0632296 A1 | 1/1995 | |
| EP | 1084198 A1 | 3/2001 | |
| EP | 1727864 A1 | 12/2006 | |
| KR | 20030017201 A | 3/2003 | |
| WO | 98/51747 A1 | 11/1998 | |
| WO | 9920695 A1 | 4/1999 | |
| WO | 03011980 A1 | 2/2003 | |
| WO | 03/057773 A1 | 7/2003 | |
| WO | 2008017364 A2 | 2/2008 | |

OTHER PUBLICATIONS

Hench et al., "The Sol-Gel Process," from Chem. Rev. 1990, 90, pp. 33-72.*
PCT Application No. PCT/EP2010/004327, Notification of Transmittal of Translation of the International, Preliminary Report on Patentability (Chapter I or Chapter II), dated Feb. 16, 2012.
Bu, S. J., et al., "Synethesis of TiO2 Porous Thin Films by Polyethylene Glycol Templating and Chemistry of the Process," Journal of the European Ceramic Society, Feb. 1, 2005, vol. 25, No. 5.
English Abstract of DE 102005005782.
English Abstract of KR 20030017201.
English Abstract of DE 19912160.
English Abstract of WO 2008017364.
English Abstract of WO 9920695.

* cited by examiner

*Primary Examiner* — Kara Boyle
(74) *Attorney, Agent, or Firm* — Cahn & Samuels, LLP

(57) ABSTRACT

A method for producing thin films, particularly for coating surfaces includes a) adding surface-active substances to flowable compositions comprising nanoscale inorganic particulate solids having polymerizable and/or polycondensable organic surface groups; b) forming one or more thin films stabilized by the accumulation of the surface-active substances at the interface(s), the forming of one or more thin films taking place through the generation of bubbles, foam, through the formation of minimal surfaces and/or through the wetting of surfaces; and c) solidifying the films by polymerization and/or polycondensation.

17 Claims, 5 Drawing Sheets a)

b)

a)

b)

METHOD FOR PRODUCING THIN FILMS AND THE APPLICATION THEREOF

This patent application is a U.S. national stage application of PCT international application PCT/EP2010/004327 filed on 15 Jul. 2010 and claims priority of German patent document 10 2009 035 673.8 filed on 30 Jul. 2009, the entirety of which is incorporated herein by reference.

FIELD OF THE INVENTION

The invention relates to a method for producing thin films, more particularly for the coating of surfaces, preferably of pigments or flakes, more particularly interference pigments.

BACKGROUND OF THE INVENTION

By pigments (Latin pigmentum; paint, makeup) are meant colorants which in the application medium (binders, diluents) are insoluble and in the colored end application are therefore present in the form of finely divided solids (pigment particles). The impression of color they give comes about either through absorption or reflection (remission) of particular frequency components of visible light.

Pigments in accordance with this definition constitute a suspension of pigment particles in a matrix. As they are present in the form of solids, the resulting color effect is affected not only by the basic substance itself but also by its shape, size, surface, and disposition. With conventional pigments, the color effect derives from absorption or reflection of particular wavelengths as a result, for example, of selective excitation of electron transitions in atoms and/or molecules of the pigment material, or by selective excitation of electron vibrations within characteristic functional groups of the pigment material. Regarding the production, processing, and handling of pigments in paints or coatings, for example, or in other coloring formulations, there is extensive prior art known.

Besides the conventional pigments, a large part has been played more recently by luster pigments or effect pigments. With this kind of pigments, the color effect is influenced, or even wholly brought about, by interference or diffraction (scattering). This effect occurs when light is diffracted at regular structures which have dimensions similar to those of the wavelengths of the light. As a result of transit time differences which occur in this case, there may be an attenuation (destructive interference) or intensification (constructive interference) as a function of the wavelength of the light. The structures may be, for example, thin layers of high refractive index, or else regular lines or dots, examples being diffraction gratings. Because of the generation of color by reflection, therefore, it is no longer the inherent color of the pigment that is critical, but rather its structure and the angle of incidence of the light, and also its orientation relative to the viewer. Consequently it is possible to achieve color effects which are not possible with conventional pigments. The more uniform the orientation of the pigments, the more intense the effects are.

Diffractive Pigments

The generation of colors using diffractive elements, such as diffraction gratings, for example, is described in U.S. Pat. No. 3,957,354 or EP 0 632 296, for example. These texts disclose linear patterns which on irradiation with sunlight or another polychromatic light source lead to particular defined color impressions.

Another approach is disclosed by the text DE 199 12 160. In order to produce a colored image or a hologram present in the form of a digitally stored image, a material having a permanently embossable surface is embossed with dots which in each case exhibit a pattern of lines running in parallel, with a distance between them in the range from 100 nm to 2000 nm, depending on the color to be generated. The dots are embossed by means of a needle printer or dot-matrix machine which has a set of needle points for the required base colors.

The use of diffractive structures on pigments or on leaflet-like pigments (flakes) is disclosed in DE10252645 A1 or WO2003/011980.

The problem with these structures is that of endowing them with additional optical properties by the application of thin layers, since for this purpose it is necessary to maintain their structure.

Interference Pigments

Interference pigments usually consist of platelet-shaped substrates coated thinly with layers that refract light. Depending on the thickness of the coating, different colors can be produced. Pigments of this kind are also referred to as pearlescent pigments. A substrate commonly used is mica, in various particle sizes. A coating employed is usually $TiO_2$, preferably in rutile modification. Thus, for example, the laid-open specification WO9920695 (Merck) discloses interference pigments based on multiply coated, platelet-shaped substrates, having at least one layer sequence of: (A) a coating having a high refractive index (B) a colorless coating having a low refractive index.

U.S. Pat. No. 3,438,796 and U.S. Pat. No. 5,135,812 describe, for example, metallic luster pigments which have a central opaque aluminum film coated on both sides in alternation with dielectric films of low refractive index, such as silicon dioxide or magnesium fluoride, for example, and with partially transparent metal films, such as chromium or aluminum for example. Because of the production method, the central metal film in these pigments is coated only on the top and bottom faces of the platelets, while the side faces constitute fracture edges and are open toward the medium.

In view of the great importance of interference pigments as luster pigments or effect pigments, there exists an extensive prior art on the single and multiple coating with different materials. In this prior art, there is description not only of coatings for influencing the refraction of light, but also, for example, of protective layers, (e.g., DE 10 2006 009 129 A1, EP 1 727 864 B1) or layers for influencing the orientation of the pigments (EP 1 084 198 B1).

Typical substrates for such pigments include thin platelets of metal oxides, silicates (e.g., mica), but also glass or metal platelets, or even platelets made of polymers.

Besides individual pigments it is also possible for leaflet-like platelets (flakes) or whole surfaces to be coated with one or more interfering layers. However, the production of such thin defined layers, more particularly of interference layers, is difficult, since exacting requirements are imposed on the homogeneity of the layer.

At the same time, production by gas-phase deposition is complicated and expensive, and is not very variable in terms of the substances that can be used. The use of sol-gel systems for coating is indeed more versatile, but the production of thin films by the techniques described is difficult.

DE 198 23 732 A1 discloses the use of polymerizable particulate solids for producing optical multilayer systems, but does not describe influencing the surface tension for the purpose of producing thin layers or films, or the production of pigments.

Furthermore, the provision of suitable substrates for interference pigments or flakes or relatively large surfaces with a suitable layer thickness is also a problem. By means of relatively thin substrates it is possible to reduce not only the thickness of the coated pigments but also the thickness of the requisite coat of a paint comprising these pigments. In this context it is also important that a production method for substrates is particularly versatile, in order to provide a broad spectrum of substrates, for different colors or refractive indices, for example.

Problem

The problem addressed by the present invention is to specify a method which allows the production of films, more particularly for the coating of surfaces, more particularly of pigments or flakes. The method ought ideally to be suitable at the same time for producing pigments, flakes or sheets. In this context, the method ought not only to be versatile in terms of the materials or substrates which can be used, but also easy to implement and inexpensive.

SUMMARY OF INVENTION

This problem is solved by the inventions with the features of the independent claims. Advantageous developments of the inventions are characterized in the dependent claims. The wording of all of the claims is hereby incorporated by reference as part of the content of this description. The invention also encompasses all conceivable, and more particularly all stated, combinations of independent and/or dependent claims.

Described in more detail below are individual method steps. The steps need not necessarily be carried out in the stated order, and the method to be described may also have other, unspecified steps.

As a solution to the problem identified above, a method for producing films is proposed which is characterized by the following method steps.
  a) Adding surface-active substances to flowable compositions comprising nanoscale inorganic particulate solids having polymerizable and/or polycondensable organic surface groups;
  b) forming one or more thin films stabilized by the accumulation of the surface-active substances at the interface(s), the forming of one or more thin films taking place through generation of bubbles, foam, through formation of minimal surfaces and/or through wetting of surfaces;
  c) solidifying the films by polymerization and/or polycondensation.

As a result of the method of the invention, surprisingly, films are obtained which have a thickness in the range from micrometers through to a few nanometers. The films produced, moreover, are homogeneous, and their thickness is easy to control. As a result of the large spectrum of possibilities for variation in terms not only of the reactants and additives but also of the method conditions, the method is very versatile and simple. It therefore allows the rapid, easy, and cost-effective mass production of such films.

Thin in the sense of the invention denotes a thickness in the range from 10 to 1000 nm, preferably in the range from 50 to 800 nm.

By using nanoscale particles comprising polymerizable and/or polycondensable surface groups, the possibility exists of producing stable films even under very mild conditions, e.g., low temperatures, and/or via photopolymerization. Preference is given to temperatures of below 50° C., more preferably of below 30° C. By this means it is possible to produce very homogeneous films having a high solids content.

In this context it has been found, entirely surprisingly, that by adding surface-active substances it is possible to generate the production of thin films both without substrate, and also for the coating of surfaces.

In the present description and the appended claims, "nanoscale inorganic particulate solids" are those having an average particle size (an average particle diameter) of not more than 200 nm, preferably, of not more than 100 nm, and more particularly not more than 70 nm. A particularly preferred particle size range is situated at 5 to 50 nm.

The nanoscale inorganic particulate solids may consist of any desired materials, but preferably consist of metals, and more particularly of metal compounds, such as, for example, (optionally hydrated) oxides such as $Ce_2O_3$, ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$, ITO or $WO_3$; chalcogenides such as, for example, sulfides (e.g., CdS, ZnS, PbS, and $Ag_2S$), selenides (e.g., GaSe, CdSe, and ZnSe), and tellurides (e.g., ZnTe or CdTe), halides such as AgCl, AgBr, AgI, CuCl, CuBr, $CdI_2$, and $PbI_2$, carbides such as $CdC_2$ or SiC; arsenides such as AlAs, GaAs, and GeAs; antimonides such as InSb; nitrides such as BN, AlN, $Si_3N_4$, and $Ti_3N_4$, phosphides such as GaP, InP, $Zn_3P_2$, and $Cd_3P_2$, phosphates, silicates, zirconates, aluminates, stannates, and the corresponding mixed oxides (e.g., those with perovskite structure such as $BaTiO_3$ and $PbTiO_3$).

The nanoscale inorganic particulate solids used in the method of the invention are preferably those of oxides, sulfides, selenides, and tellurides of metals, and mixtures thereof. Particularly preferred in accordance with the invention are nanoscale particles of $SiO_2$, $TiO_2$, $ZrO_2$, ZnO, $Ta_2O_5$, $SnO_2$, and $Al_2O_3$ (in all modifications, more particularly in the form of boehmite, AlO(OH)), and mixtures thereof.

Since the nanoscale particles which can be used in accordance with the invention span a broad range of refractive indices, the refractive index of the films can be conveniently adjusted to the desired value through appropriate selection of these nanoscale particles.

The nanoscale particulate solids used in accordance with the invention can be produced in a conventional manner, as for example by flame pyrolysis, plasma processes, gas-phase condensation processes, colloid techniques, precipitation processes, sol-gel processes, controlled nucleation and growth operations, MOCVD processes, and (micro)emulsion processes. These processes are described comprehensively in the literature. It is possible more particularly to employ, for example, metals (after the reduction in the precipitation processes, for example), ceramic oxidic systems (by precipitation from solution), or else saltlike or multicomponent systems. The saltlike or multicomponent systems also include semiconductor systems.

The nanoscale inorganic particulate solids that are used in accordance with the invention, provided with polymerizable and/or polycondensable organic surface groups, can be prepared in principle in two different ways: firstly, by surface modification of ready-prepared nanoscale inorganic particulate solids; and secondly by preparation of these inorganic nanoscale particulate solids using one or more compounds which possess such polymerizable and/or polycondensable moieties.

The organic polymerizable and/or polycondensable surface groups may be any desired groups known to the skilled person that are amenable to a radical, cationic or anionic, thermal or photochemical polymerization or to a thermal or photochemical polycondensation (optionally in the presence of a suitable initiator and/or catalyst). Preference in accordance with the invention is given to surface groups which possess a (meth)acryloyl, allyl, vinyl or epoxy group, with (meth)acryloyl and epoxy groups being particularly preferred. Polycondensable groups include, in particular, hydroxyl, carboxyl, and amino groups, which can be used to obtain ether, ester, and amide bonds between the nanoscale particles.

It is also preferred in accordance with the invention for the organic moieties which are present on the surfaces of the nanoscale particles and which comprise the polymerizable and/or polycondensable groups to have a relatively low molecular weight. More particularly the molecular weight of the (purely organic) moieties ought not to exceed 500 and preferably 300, more preferably 200. This, of course, does not rule out a significantly higher molecular weight on the part of the compounds (molecules) comprising these moieties (e.g., 1000 or more).

As already mentioned above, the polymerizable/polycondensable surface groups may be prepared in principle in two ways. Where ready-prepared nanoscale particles are surface-modified, this purpose is served suitably by all (preferably low molecular weight) compounds which firstly possess one or more groups able to react or at least interact with functional groups present on the surface of the nanoscale particulate solids (such as OH groups in the case of oxides, for example), and secondly contain at least one polymerizable/polycondensable group. Accordingly, the compounds in question may, for example, form both covalent bonds and ionic (salt-like) or coordinative (complex) bonds to the surface of the nanoscale particulate solids, whereas the pure interactions include, by way of example, dipole-dipole interactions, hydrogen bonds, and by van-der-Waals interactions. Preference is given to the formation of covalent and/or coordinative bonds. Specific examples of organic compounds which can be employed for the surface modification of the nanoscale inorganic particulate solids are, for example, unsaturated carboxylic acids such as acrylic acid and methacrylic acid, β-dicarbonyl compounds (e.g., β-diketones or β-carbonylcarboxylic acids) having polymerizable double bonds, ethylenically unsaturated alcohols and amines, amino acids, epoxides, and the like. Particularly preferred in accordance with the invention as such compounds are—especially in the case of oxidic particulate solids—hydrolytically condensable silanes having at least (and preferably) one nonhydrolyzable radical which possesses a polymerizable carbon-carbon double bond or an epoxide ring, more preferably (meth)acryloyloxyalkyltrialkoxysilanes such as, for example, 3-methacryloyloxypropyltri(m)ethoxysilane and glycidyloxyalkyltrialkoxysilanes such as, for example, 3-glycidyloxypropyltri(m)ethoxysilane.

Where the actual preparation of the nanoscale inorganic particulate solids takes place using one or more compounds which possess polymerizable/polycondensable groups, there is no need for subsequent surface modification (although, of course, such modification is possible as an additional measure).

In accordance with the invention, surface-active substances are added to the flowable composition. Surface-active substances are substances which lower the surface tension of a liquid or the interfacial tension between two phases. Their effect derives from the preferred accumulation at the phase boundary. Under ideal conditions, a monolayer of the surface-active substances is formed at the boundary. The films which can be produced as a result are able to be very thin, down to a few nanometers, by virtue of the lowered surface tension. These films may be prepared on a surface of a substrate, or without substrate, as double layers of the surface-active substances, i.e., films in which both surfaces have a liquid/gas boundary, and are stabilized by the surface-active substances. The best-known example of the formation of double layers of surface-active substances is the formation of foams or soap bubbles.

Surface-active substances used may be any compounds which lower the surface tension of the sol used, examples being phenol derivatives, modified lecithin, modified siloxanes or modified polysiloxanes, phosphoric esters and salts, modified polyurethanes, polyamine-polyester condensates, modified polyacrylates, polyethyleneimine derivatives or alkylene oxide copolymers, or mixtures thereof. Advantage is attached to those which are stable under the method conditions. Particularly preferred are surface-active substances consisting of polysiloxanes, examples being BYK-306, BYK-307, BYK-333, BYK-337, and BYK-341 (available from BYK Chemie).

The surface tension of the flowable composition is preferably between 16 and 50 nm/m, more preferably between 20 and 30 nm/m, measured by means of a Krüss K12 Processor Tensiometer.

The amount of surface-active substances in the flowable composition may be between 0.0001% by weight and 1% by weight, preferably between 0.01% by weight and 0.1% by weight.

In one development of the invention, in step b) the forming of one or more thin films takes place through generation of bubbles, foam and/or through formation of minimal surfaces, preferably by generation of bubbles or foam.

In one preferred development of the invention, the thin films are produced by the introduction of gases, air for example, i.e., through generation of bubbles or foam. In this case, for example, hemispherical bubbles are applied to a surface. It is preferred here for the diameter of these bubbles as far as possible to be below 5 cm, preferably between 0.5 and 3 cm. In the case of foam, the diameter of the bubbles present in the foam is preferably on average between 0.1 and 3 cm.

Furthermore, it is also possible for extensive films to be produced by the formation of minimal surfaces between edges of one or more bodies, as for example by the dipping of loops or nets. This allows the production of sheets and films of large surface area.

Advantageously the thickness of the resultant films can be influenced, for example, through the size of the resultant surfaces in combination with the properties of the flowable composition, as for example its surfactants content, temperature, viscosity, type of surfactants, type of solvent or solvents.

The film here is preferably not disposed on a surface. It is possible, though, for platelets added to the flowable composition to be disposed within the film that is formed.

Before the films are generated, the flowable material may be adjusted to an appropriate viscosity by means, for example, of addition of solvent or evaporation of volatile constituents (especially solvent already present).

The films produced would not be stable for long, owing to convection or evaporation. Through the use of the polymerizable and/or polycondensable surface groups, it is ensured that the films harden without substantial alteration in their shape or surface area.

In stage c) of the method of the invention, a polymerization and/or polycondensation of the polymerizable/polycondensable surface groups of the nanoscale inorganic particulate solids (and, where appropriate, of the polymerizable/polycondensable groups of the monomeric or oligomeric species used additionally) is carried out. This polymerization/polycondensation may be carried out in the manner familiar to the skilled person. Examples of suitable processes are thermal, photochemical (e.g., with UV radiation), electron-beam curing, laser curing, room-temperature curing, etc. Polymerization/polycondensation of this kind takes place optionally in the presence of a suitable catalyst or initiator, which is added to the flowable material no later than immediately before the thin films are formed.

Initiators/initiator systems contemplated include all initiators/initiator systems which are familiar and are known to the skilled person, including free-radical photoinitiators, free-radical thermoinitiators, cationic photoinitiators, cationic thermoinitiators, and any desired combinations thereof.

Specific examples of free-radical photoinitiators which can be used are Irgacure™ 819 (bisacylphosphane oxide), Irgacure™ 819DW, Irgacure™ 184 (1-hydroxycyclohexyl phenyl ketone), Irgacure™ 500 (1-hydroxycyclohexyl phenyl ketone, benzophenone), and other photoinitiators of the Irgacure™ type available from the company Ciba Speciality Chemicals Inc.; Darocur™ TPO, 4265, MBF, 1173, 1116, 1398, 1174, and 1020 (likewise available from Ciba Speciality Chemicals Inc.); benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzyl dimethyl ketal, 1,1,1-trichloroacetophenone, diethoxyacetophenone, and dibenzosuberone.

Examples of free-radical thermoinitiators include, inter alia, organic peroxides in the form of diacyl peroxides, peroxydicarbonates, alkyl peresters, alkyl peroxides, perketals, ketone peroxides, and alkyl hydroperoxides, and also azo compounds. Specific examples here include more particularly dibenzoyl peroxide, tert-butyl perbenzoate, and azobisisobutyronitrile.

An example of a cationic photoinitiator is Cyracure™ UVI-6974, whereas one preferred cationic thermoinitiator is 1-methylimidazole.

These initiators are used in the customary amounts known to the skilled person (preferably 0.01-5% by weight, more particularly 0.1-2% by weight, based on the total solids content of the coating composition. In certain circumstances it is of course possible to do without the initiator entirely, as in the case of electron-beam curing or laser curing, for example).

The polymerization/polycondensation of stage c) of the method of the invention takes place preferably thermally or by irradiation (more particularly with UV light). Particularly preferred is a photochemical polymerization/polycondensation or a combination of thermal and photochemical polymerization/polycondensation. By this means it is possible to avoid loads on the films. Exposure here takes place preferably by means of light sources which emit UV light (e.g., mercury vapor lamps, xenon lamps, laser light).

The organically crosslinked structure resulting from the polymerization and/or polycondensation endows the films with a combination of elasticity and stability.

The polymerization/polycondensation may be preceded by the removal of other volatile, unpolymerizable/uncondensable compounds from the layer applied to the substrate. This removal of volatile constituents may alternatively or additionally take place at the stage of the polymerization/polycondensation or thereafter.

As already mentioned above, the nanoscale inorganic particulate solids may be prepared, for example, by the sol-gel process, using at least one hydrolytically polycondensable compound having at least one polymerizable/polycondensable group. In this way, for example, it is possible to use hydrolyzable alkyl compounds, alkoxy compounds or halides which in line with the definition above comprise at least one polymerizable and/or polycondensable group; use may be made, for example, of compounds (halides, alkoxides, carboxylates, chelates, etc.) of boron, aluminum, titanium, zirconium, silicon, bismuth, tin, zinc, or vanadium, more preferably comprising $C_{1-6}$ alkoxides, such as, for example, methoxy, ethoxy, n-propoxy, isopropoxy, and butoxy groups. Alternatively of course it is possible to use one or more polycondensable compounds in combination with a hydrolytically polycondensable compound having at least one polymerizable and/or polycondensable group.

The hydrolysis and polycondensation is carried out either in the absence of a solvent or, preferably, in an aqueous or aqueous/organic reaction medium, optionally in the presence of an acidic or basic condensation catalyst such as HCl, $HNO_3$ or $NH_3$. When a liquid reaction medium is used, the starting components are soluble in the reaction medium. Suitable organic solvents include more particularly solvents which are miscible with water, examples being mono- or polyfunctional aliphatic alcohols, ethers, esters, ketones, amides, sulfoxides, and sulfones.

The hydrolysis and polycondensation of the aforementioned components is carried out advantageously in the presence of one or more complexing agents, which may optionally contain one or more polymerizable groups; for example, in the presence of nitrates, β-dicarbonyl compounds (e.g., acetylacetonates or acetoacetic esters), carboxylic acids (e.g., methacrylic acid) or carboxylates (e.g., acetate, citrate or glycolate), betaines, diols, diamines (e.g., DIAMO) or crown ethers.

Particular preference is given to alkoxy-titanates with addition of surface-modifying polymerizable compounds, more preferably alkoxy-titanates with addition of β-dicarbonyl compounds, more preferably tetrabutyl orthotitanate with addition of acetylacetone.

In one preferred version of the method of the invention the films, after drying, are subjected to a pyrolysis in order to compact the films and/or to remove the organic constituents. By this means it is possible, when using oxidic inorganic particulate solids, for example, to generate homogeneous oxide layers. The pyrolysis is carried out preferably at temperatures between 400° C. and 1500° C. degrees, more preferably between 400° C. and 600° C. degrees. The conditions may be selected in accordance with the composition of the film. The skilled person is familiar with such adaptations. As a result of the organically crosslinked structure of the films, there is no cracking or defect during pyrolysis. The pyrolysis may further reduce the thickness of the film. The finished films preferably have a thickness of between 10 and 800 nm, preferably between 50 and 700 nm.

Following the solidification of the films, it may be necessary for the films to be comminuted—for example, if pigments or flakes have been produced or coated. This can done with technologies that are known to the skilled person, as for example using a ball mill, pinned-disk mill or airjet mill. The pigments or flakes obtained may then be classified further, according to size, for example.

The invention additionally relates to a thin film producible more particularly by adding surface-active substances to a flowable composition comprising nanoscale inorganic particulate solids having polymerizable and/or polycondensable organic surface groups, forming one or more thin films stabilized by the accumulation of the surface-active substances at the interface(s), wherein the forming of one or more thin films is achieved through the generation of bubbles, foam and/or through formation of minimal surfaces and/or through wetting of surfaces and solidifying the films by polymerization and/or polycondensation.

The thin film preferably comprises nanoscale particles selected from the metal compounds, more particularly oxides, sulfides, selenides, and tellurides, or mixtures thereof. Particularly preferred are $SiO_2$, $TiO_2$, $ZrO_2$, $Ta_2O_5$, $SnO_2$, $B_2O_3$ or $Al_2O_3$ or mixtures thereof.

In one advantageous development the film has been hardened and compacted by pyrolysis. In a pyrolysis of this kind, the organic groups are burnt out and the film subsequently consists only of its inorganic constituents, preferably $SiO_2$, $TiO_2$, $ZrO_2$, $Ta_2O_5$, $SnO_2$, $B_2O_3$ or $Al_2O_3$ or mixtures thereof.

The invention further relates to the use of a film of the invention, or of a composition of the invention, for the coating of surfaces, preferably consisting of metal, an alloy, a ceramic, a metal oxide or mixture of metal oxides, more particularly iron oxide, $Al_2O_3$ or $SiO_2$, quartz, graphite, mica, glass or glasslike material. Preference here is given to pigments or flakes.

Furthermore, the high flexibility of the films that are formed also allows relatively complicated structures to be coated, examples being diffractive surface elements, which would not be retained in conventional methods. Thus, for example, relief pigments or holographic pigments can be coated. In a further advantageous development, the interfering layers can be applied in this way to diffractive surface elements.

In a further advantageous development, the method of the invention can be used for applying films to pigments or flakes or similar substrates. These substrates can accordingly be coated in a simple way with a thin film. Substrates which can be used, therefore, are substrates known to the skilled person for luster pigments. These substrates are generally platelet-shaped pigments or flakes, which may be made of organic or inorganic materials. Platelet-shaped means that they have a length of 3 to 150 μm, preferably of 5 to 70 μm, and a width of 3 to 150 μm, preferably 5 to 50 μm, and a thickness of 0.1 to 2 μm. Examples of platelets are mica flakes or iron oxide platelets.

In a further development of the method, the films obtained may be provided with further coatings, not only by repetition of the method of the invention but also by application of other coating techniques, which are known to the skilled person. It is preferred to apply two or more layers of different films, more particularly films having different optical properties. Particular preference here is given to further layers having different refractive indices, and also to protective layers, coloring layers, or layers for influencing the hydrophobicity or hydrophilicity of the surface.

In a further development of the method, further coloring agents may be added to the flowable composition, examples being metal colloids, dyes, in order to influence the color of the films.

In a further development of the method, the films obtained may additionally be provided with different coatings on both sides, as for example only on the outside of the bubbles or underside of the films.

In a further development of the method, diffractive surface elements are applied to the films, by embossing or lithography, for example.

In a further advantageous development, the films produced in accordance with the invention without substrate, as bubbles or foam, for example, may be processed to pigments or flakes or to substrates of effect pigments or flakes.

The invention further relates to the use of one or more films for producing coatings, sheets, pigments, or flakes, more particularly for generating interference effects, such as pearlescent pigments.

This includes, for example, effect pigments or pearlescent pigments, pigments for printer inks, varnishes, paints, security applications, optical systems, such as interference filters, antireflection systems, color filters.

Other details and features will be apparent from the following description of preferred working examples in conjunction with the dependent claims. The respective features here may be actualized alone or in groups in combination with one another. The possibilities for solving the problem are not confined to the working examples. For example, range figures always include all—unstated—in-between values and all conceivable subranges.

Working Examples

Varnish Composition Used

In a 250 ml three-neck flask, 20 g of tetrabutyl orthotitanate [$Ti(OC_4H_9)_4$] are introduced and cooled in an ice bath. Added slowly dropwise thereto (15 minutes) with stirring are 5 g of acetylacetone (AcAc). Following complete addition, the reaction mixture after 20 minutes is removed from the ice bath and is then stirred at 25° C. In a second vessel, 20 g of diethylene glycol diethyl ether (DEGDE) are introduced, 30 mg of BYK 307 are added, and the mixture is stirred at 25° C. for 15 minutes. The sol prepared in the first step is added slowly with stirring to the second mixture. Following stirring (30 min) at 25° C., 0.2 g of the photoinitiator Irgacure TM 819 is added. The surface tension is 26.2 mN/m (measured using a Krüss K12 Processor Tensiometer). In order to produce effect pigments, mica platelets may be added additionally.

The composition was processed further to form bubbles or foam.

The working examples are represented schematically in the figures. Identical reference numerals in the individual figures denote identical or functionally identical elements or elements which correspond to one another in terms of their function. In particular:

DETAILED DESCRIPTION OF INVENTION

Figure 1:
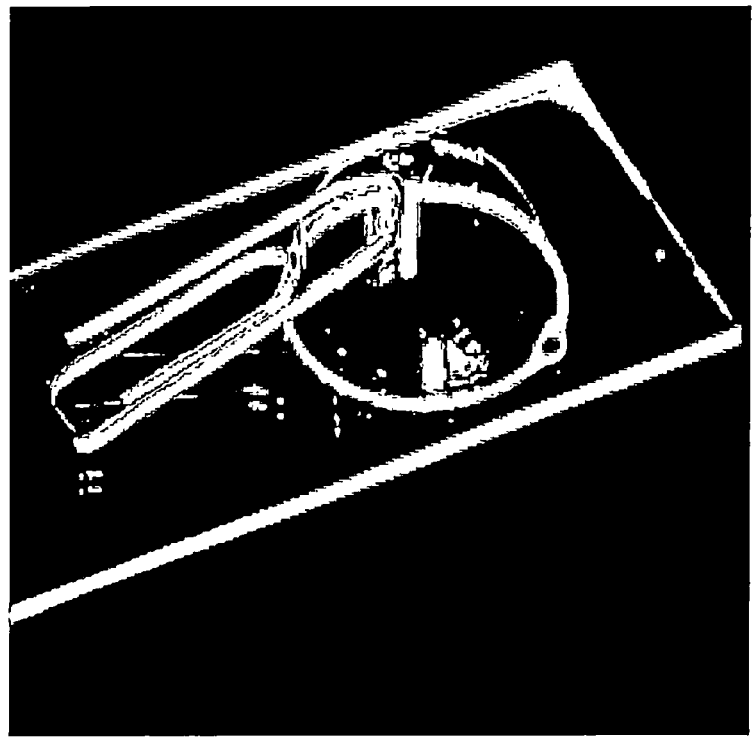
FIG. 1 shows a) large bubbles of organically crosslinked $TiO_2$ b) small bubbles of crosslinked $TiO_2$.
Figure 1:
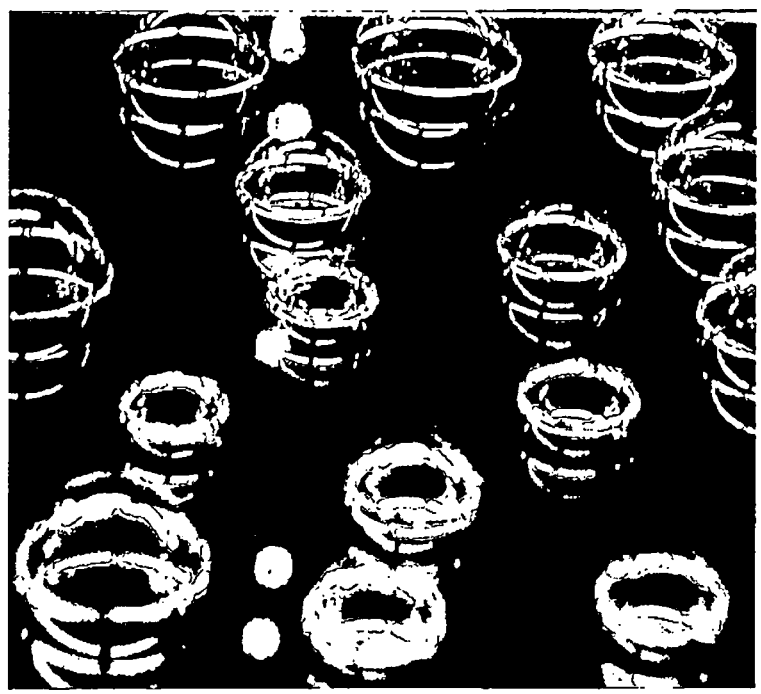

FIG. 1 shows a) large and b) small bubbles of crosslinked $TiO_2$ particles of the varnish composition of the invention after drying at 25° C. The rested paperclip shows the stability of the solidified film.

Figure 2:
FIG. 2 shows oven-treated, organically crosslinked $TiO_2$.
Figure 2:

FIGS. 2 a) and b) show pyrolyzed films of crosslinked $TiO_2$ particles of the varnish composition of the invention (2 hours at 550° C. to 600° C.-1500° C.). The organic constituents are combusted and $TiO_2$ is formed; the interference properties of the material are clearly apparent.

Figure 3:
FIG. 3 shows a TEM micrograph of a bubble wall after pyrolysis.
Figure 4:
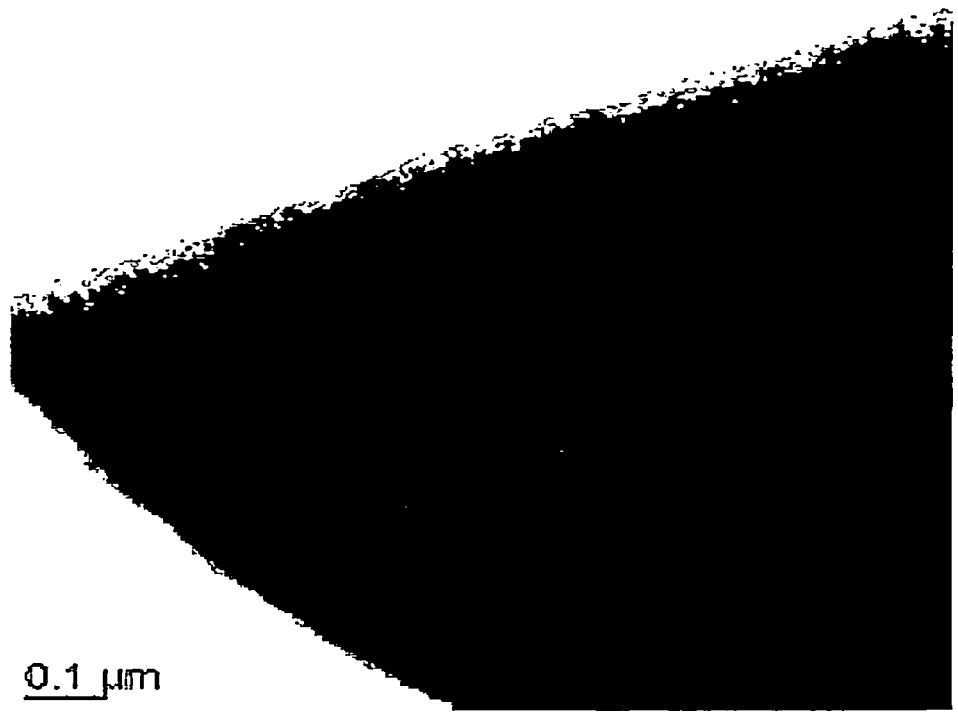
FIG. 4 shows a TEM micrograph of a bubble wall after pyrolysis.

FIG. 3 and FIG. 4 show TEM micrographs of a film after the pyrolysis. The structure of the crosslinked nanoparticles is still clearly apparent.

Figure 5:
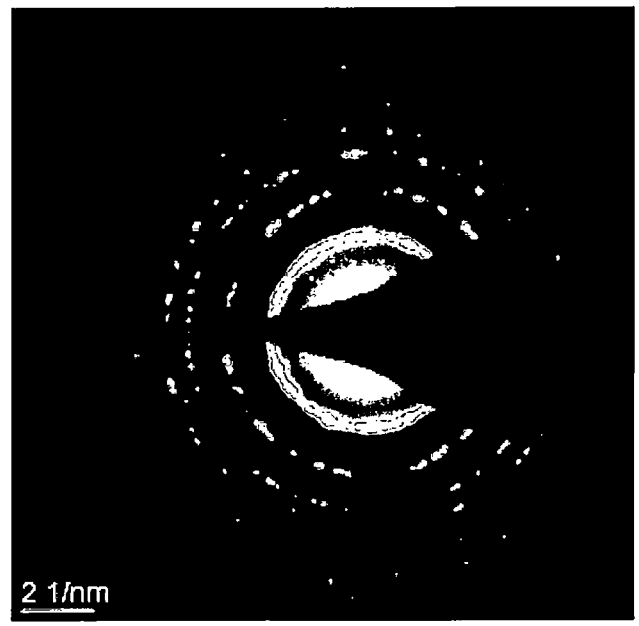
FIG. 5 shows an electron scattering image.

FIG. 5 shows an electron diffraction image of a pyrolyzed $TiO_2$ film. The electron diffraction shows crystalline $TiO_2$.

Figure 6:
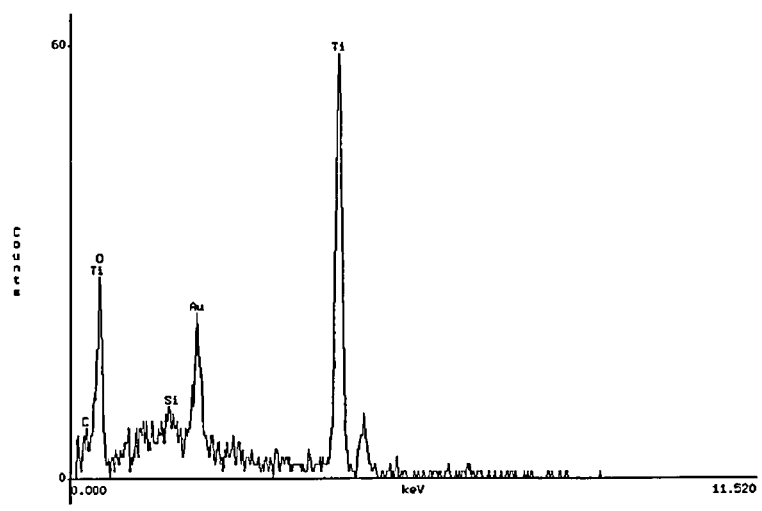
FIG. 6 shows an elemental analysis.

FIG. 6 elemental analysis of a pyrolyzed $TiO_2$ film.

Figure 7:
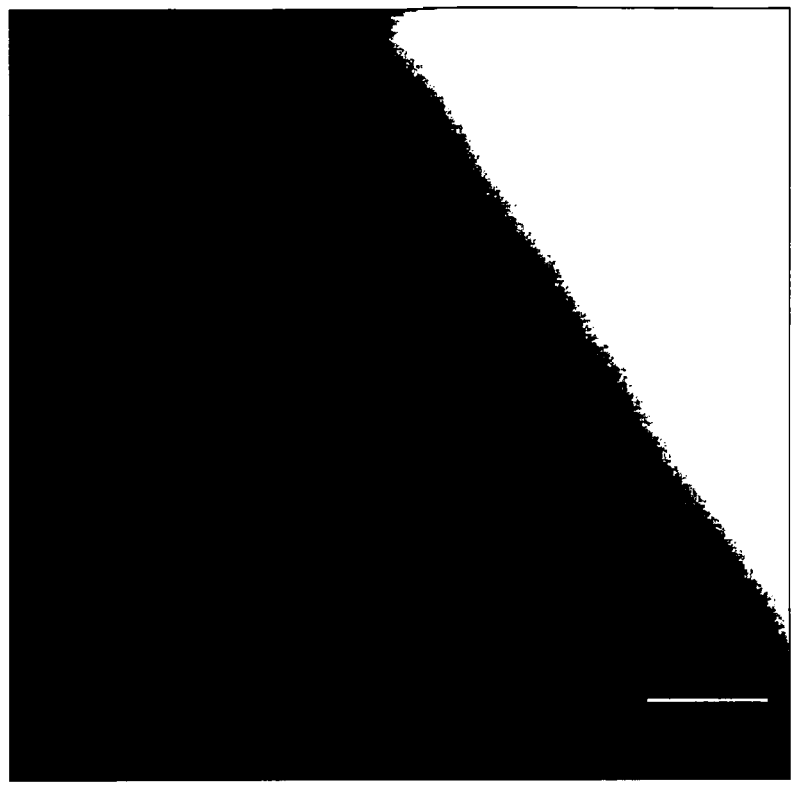
FIG. 7 shows an SEM of the cross sections of the interference pigment.

FIG. 7 SEM (scanning electron microscope) cross section through an interference pigment produced. The micrograph shows a uniform and homogeneous coating.

LIST OF REFERENCES CITED

U.S. Pat. No. 3,957,354
EP 0 632 296
DE 199 12 160
DE 102 52 645
WO 2003/011980
WO9920695
U.S. Pat. No. 3,438,796
U.S. Pat. No. 5,135,812
DE 10 2006 009 129 A1
EP 1 727 864 B1
EP 1 084 198 B1
DE 198 23 732 A1

The invention claimed is:

1. A method for producing thin films, comprising the following method steps:
   a) adding surface-active substances to flowable compositions comprising nanoscale inorganic particulate solids having polymerizable and/or polycondensable organic surface groups;
   b) forming one or more thin films stabilized by the accumulation of the surface-active substances at the interface(s), the forming of one or more thin films taking place through the generation of bubbles, foam, and/or through the formation of minimal surfaces;
   c) solidifying the one or more thin films by polymerization and/or polycondensation,
   wherein the one or more thin films are subjected to pyrolysis at a temperature in a range from about 400° C. to about 1500° C.

2. The method as claimed in claim 1, wherein the solidifying in step c) takes place by photochemical polymerization and/or polycondensation.

3. The method as claimed in claim 1, wherein the nanoscale inorganic particulate solids are prepared by the sol-gel process.

4. The method as claimed in claim 1, wherein in step b) the forming of one or more thin films takes place through generation of bubbles and/or through formation of minimal surfaces.

5. The method as claimed in claim 1, wherein the nanoscale particulate solids are selected from metal compounds.

6. The method as claimed in claim 5, wherein the nanoscale particulate solids comprise $SiO_2$, $TiO_2$, $ZrO_2$, $Ta_2O_5$, $SnO_2$, $B_2O_3$ or $Al_2O_3$ or mixtures thereof.

7. The method as claimed in claim 1, wherein the polymerizable and/or polycondensable surface groups are selected from organic radicals which possess a (meth)acryloyl, vinyl, allyl, β-dicarbonyl or epoxy group.

8. A method of coating a surface comprising producing at least one film according to claim 1 and applying the at least one film to one or more surfaces selected from the group consisting of metal, an alloy, a ceramic, quartz, mica, graphite, glass or glasslike material, and to one or a mixture of metal oxide(s).

9. A method as claimed in claim 8, wherein the film is applied to diffractive surface elements.

10. A method as claimed in claim 8, wherein the film is applied to pigments or flakes.

11. A method as claimed in claim 8, wherein two or more layers of identical or different films are applied.

12. The method as claimed in claim 5, wherein the nanoscale particulate solids are selected from the group consisting of oxides, sulfides, selenides, tellurides, and mixtures thereof.

13. The method as claimed in claim 1, wherein the one or more thin films are subjected to pyrolysis at temperatures in a range from about 400° C. to about 650° C.

14. A method as claimed in claim 8, wherein the film is applied to a surface comprising $Al_2O_3$ or $SiO_2$.

15. A method as claimed in claim 8, wherein two or more layers of films having different optical properties are applied.

16. A method as claimed in claim 8, wherein the films generate interference effects.

17. The method as claimed in claim 1, further comprising producing sheets, pigments or flakes from the one or more solidified thin films.

* * * * *